United States Patent
McGillvray et al.

(10) Patent No.: US 8,036,483 B2
(45) Date of Patent: Oct. 11, 2011

(54) COUPLET CORRECTION IN IMAGE SENSORS

(75) Inventors: Gary McGillvray, Glasgow (GB); David Storrar, Falkirk (GB); Ewen Brown, Edinburgh (GB); Ed Duncan, Lothian (GB)

(73) Assignee: STMicroelectronics (Research & Development) Limited, Marlow-Buckinghamshire (GB)

( * ) Notice: Subject to any disclaimer, the term of this patent is extended or adjusted under 35 U.S.C. 154(b) by 998 days.

(21) Appl. No.: 11/753,737

(22) Filed: May 25, 2007

(65) Prior Publication Data

US 2007/0285535 A1    Dec. 13, 2007

(30) Foreign Application Priority Data

May 29, 2006  (EP) ...................................... 06270054

(51) Int. Cl.
*H04N 9/64* (2006.01)
(52) U.S. Cl. .................... 382/260; 348/246; 348/E5.081
(58) Field of Classification Search .................. 382/254, 382/260; 348/246
See application file for complete search history.

(56) References Cited

U.S. PATENT DOCUMENTS

| | | | | |
|---|---|---|---|---|
| 7,034,873 | B2 | 4/2006 | Mendis et al. | 348/246 |
| 7,375,749 | B2 * | 5/2008 | Hattori | 348/246 |
| 7,444,037 | B2 * | 10/2008 | Kita | 382/300 |
| 7,602,987 | B2 * | 10/2009 | Kuramoto | 382/254 |
| 2005/0047658 | A1 * | 3/2005 | Kita | 382/167 |
| 2005/0195297 | A1 * | 9/2005 | Kita | 348/246 |
| 2006/0152530 | A1 * | 7/2006 | Smith | 345/611 |

FOREIGN PATENT DOCUMENTS

| | | |
|---|---|---|
| EP | 0635973 | 1/1995 |
| EP | 1343311 | 9/2003 |
| WO | 95/27367 | 10/1995 |
| WO | 2004/110053 | 12/2004 |

* cited by examiner

*Primary Examiner* — Stephen Koziol
(74) *Attorney, Agent, or Firm* — Lisa K. Jorgenson; Allen, Dyer, Doppelt, Milbrath & Gilchrist, P.A.

(57) ABSTRACT

A digital filtering algorithm preprocesses couplet defects prior to their being operated on by a main filtering algorithm that focuses on singlet defects. The preprocessing involves the replacement of one of the defective pixel values in the couplet with a pixel value that is known to be non-defective. In preferred embodiments, the selection of the pixel value in the couplet to be replaced is customized depending on the direction of scanning of the pixel array, and can take into account edge effects of border pixels.

32 Claims, 7 Drawing Sheets

| Y(1,1) | Y(2,1) | Y(3,1) | Y(4,1) | Y(5,1) | Y(6,1) |
|--------|--------|--------|--------|--------|--------|
| Y(1,2) | Y(2,2) | Y(3,2) | Y(4,2) | Y(5,2) | Y(6,2) |
| Y(1,3) | Y(2,3) | Y(3,3) | Y(4,3) | Y(5,3) | Y(6,3) |
| Y(1,4) | Y(2,4) | Y(3,4) | Y(4,4) | Y(5,4) | Y(6,4) |

FIG. 3

(PRIOR ART)

COUPLET CORRECTION IN IMAGE SENSORS

FIELD OF THE INVENTION

The invention relates to the correction of couplet defects in image sensors. The term couplet defect is used herein to denote the presence of two defective pixels adjacent each other in any direction in a given image plane, which can be a color plane, for example.

BACKGROUND OF THE INVENTION

To produce a color sensitive image sensor, the pixels in the image sensor's pixel array are made to have different sensitivities to different frequencies of incident light, with the chosen frequencies corresponding to particular colors. A common way of achieving this is to overlay the image sensor's pixel array with a color filter array so that each pixel is overlaid with a material with specific transmission characteristics so that the pixel can be thought of as being responsive to a particular color. Usually one color is overlaid per pixel. As a short-hand notation, a red pixel is referred to as a pixel that is sensitive to incident light having a frequency in the red part of the visible spectrum of light, with similar notations used for other colors. The specific frequency responses will vary according to the type of material used, among other factors.

There are various well known patterns to use when depositing the color filter material. For each pattern, it is possible and common to separate the output of the sensor into groups of component colors. Each of these groups forms a color plane. The number of color planes and also how they are mapped onto the sensor is dependent on the color pattern used.

Unless specifically indicated otherwise, the term neighboring pixels as used herein is taken to mean that the two pixels are adjacent in a given color plane to which they both belong, rather than necessarily being physically adjacent.

To illustrate this point, FIGS. 3-6 illustrate some example color patterns. FIG. 3 shows a monochrome sensor. Each block represents a pixel which outputs a chrominance value, Y. The coordinates of each pixel are also shown. Here, neighboring pixels correspond to physically adjacent pixels, so for example, Y(3,2) is a neighbor of Y(4,2). To avoid any doubt, the color plane with respect to a monochrome sensor such as this is taken to correspond to the physical array.

FIG. 4 illustrates the common Bayer pattern, which comprises red, green and blue sensitive pixels, labeled R, G, B respectively, and with the color plane coordinates shown. As can be seen, there are twice as many green pixels as either the red or blue. Because the human eye is more sensitive to spatial information in the green channel, the sensor produces an image which appears more detailed to the human eye than other color pattern schemes. The top FIG. shows the entire array, while the lower figures show each color plane. Hence, pixels which are physical neighbors on the image sensor plane are no longer neighbors when separated into color planes. For example, R(2,2) and G(2,3) are physical neighbors but not after separation into color planes.

Also, pixels which are not neighbors on the image plane will become neighbors in color space. For example, G(2,2) and G(3,2) are not physically adjacent on the image sensor, but are neighbors after separation into color planes.

Various manufacturers use four color filters in a 2×2 grid. One of the greens is replaced with a similar, but slightly different color. This increases the color performance of the system but with only a marginal degradation in luminance detail. This technique is illustrated in FIG. 5, with the fourth color labeled as "T".

As well has 2×2 structures of color, it is also possible to have stripes of color. An example is shown in FIG. 6. This stripe pattern is popular with CRT manufacturers as it increases the tolerance of the electron gun alignment, but is not commonly used on CMOS/CCD sensors.

Image sensors commonly have defective pixels. If the number of these is small, their effect can be minimized electronically. This can be done for isolated pixel defects by use of a filtering algorithm during use of the image sensor, i.e., on the fly (reference EP1003332A). Another such technique (reference EP05250101.2) uses a scythe filter which operates over a 3×3 pixel kernel and sorts the pixels into an order based on their magnitude. Essentially, defective pixels are considered to be stuck at either dark or light, and therefore will lie at either end of a magnitude sorted list. These can then be replaced with the nearest value pixel.

However, in the case of a couplet defect, both pixels are within the kernel of operation of the filtering algorithm, and the defects are not corrected, as the replacement pixel is of the same magnitude as the identified defective pixel.

SUMMARY OF THE INVENTION

In view of the foregoing background, an object of the present invention is to overcome or mitigate problems associated with a couplet defect.

This and other objects, advantages and features in accordance with the present invention are provided by a method of correcting for pixel defects in the output of an image sensor comprising the steps of performing a preliminary filtering operation which operates on couplet defects wherein two adjacent pixels in a given image plane are defective. The preliminary filtering operation may comprise replacing the signal value of a first pixel in the couplet with a corrected signal value, and thereafter performing a main filtering operation on the signal resulting from the preliminary filtering operation.

The corrected signal value in the preliminary filtering operation may be the value of a neighboring non-defective pixel. Performing a preliminary filtering operation may comprise identifying the scanning direction of a readout process, and based on the identification, choosing a pixel value from a pixel preceding the first pixel in the direction of scanning as the corrected signal value.

The pixel preceding the first pixel in the direction of scanning may be defined by a coordinate shift. The coordinate shift with respect to the first pixel may correspond to a translation in the opposite direction along the row to the direction in which the rows are sequentially being scanned.

Performing a preliminary filtering operation may comprise, for a couplet in which the first pixel is on a border of the origin side in the direction of scanning, choosing a pixel value from a pixel proceeding the first pixel in the direction of scanning as the corrected signal value. The pixel proceeding the first pixel in the direction of scanning may be defined by a coordinate shift.

The coordinate shift with respect to the first pixel may correspond to a translation along the direction in which the rows are being scanned. Couplet defects may be identified at manufacture and their location may be stored in a memory. The memory may comprise a non-volatile memory forming part of the image sensor.

The main filtering operation may comprise obtaining a central pixel value and a plurality of neighboring pixel values, determining the average value of each opposing pair of pixel values, comparing each average value with the central pixel value, and replacing the central pixel value with the average value which is closest to the central pixel value.

A second aspect of the invention is directed to a signal processing system for use with an image sensor having a pixel array. The system may comprise preliminary filter means or preliminary filter for receiving image data and main filter means or main filter connected to receive the output of the preliminary filter.

The preliminary filter may be operative to perform a preliminary filtering operation which operates on couplet defects wherein two adjacent pixels in a given image plane are defective. The preliminary filtering operation may comprise replacing the signal value of a first pixel in the couplet with a corrected signal value. The main filter may be operative to perform a main filtering operation on the signal resulting from the preliminary filtering operation.

The corrected signal value in the preliminary filtering operation may be the value of a neighboring non-defective pixel. The preliminary filter may be configured for identifying the scanning direction of a readout process, and for choosing a pixel value from a pixel preceding the first pixel in the direction of scanning as the corrected signal value.

Choosing a pixel value may comprise defining a coordinate shift. The coordinate shift with respect to the first pixel may correspond to a translation in the opposite direction along the row to the direction in which the rows are sequentially being scanned.

The preliminary filter may be configured for identifying whether a couplet is on a border of the origin side in the direction of scanning, and for choosing a pixel value from a pixel proceeding the first pixel in the direction of scanning as the corrected signal value. Choosing a pixel value from a pixel proceeding the first pixel in the direction of scanning may comprise defining a coordinate shift.

The coordinate shift with respect to the first pixel may correspond to a translation along the direction in which the rows are being scanned. The system may further comprise a memory for storing locations of couplet defects. The memory may comprise a non-volatile memory for forming part of the image sensor.

The main filter may carry out the steps of obtaining a central pixel value and a plurality of neighboring pixel values, determining the average value of each opposing pair of pixel values, comparing each average value with the central pixel value, and replacing the central pixel value with the average value which is closest to the central pixel value.

Another aspect of the invention is directed to an image sensor comprising a pixel array, control means or a controller for operating the pixel array to produce an image data stream, and a system for operating on the image data stream. The image sensor may be formed as a single chip. In further aspects, a corresponding mobile communications device, webcam, optical mouse or video camera may be provided.

BRIEF DESCRIPTION OF THE DRAWINGS

An embodiment of the invention will now be described, by way of example only, with reference to the drawings, in which:

FIGS. 3-6 illustrate various different known color plane configurations according to the prior art.

DETAILED DESCRIPTION OF THE PREFERRED EMBODIMENTS

Figure 1:
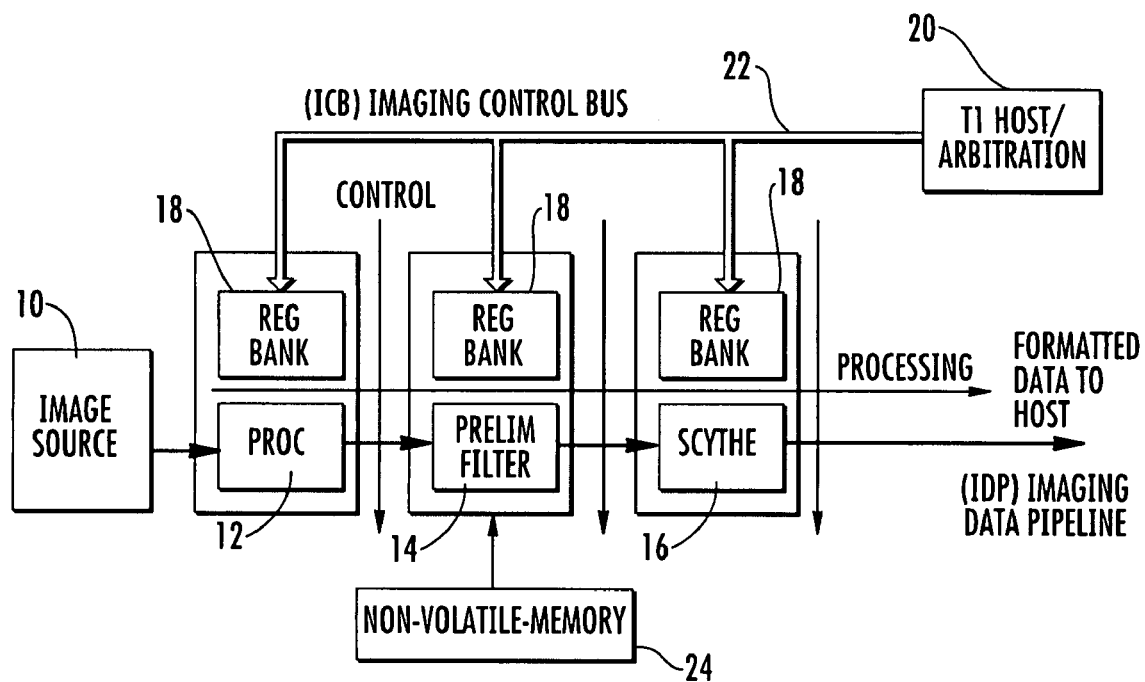
FIG. 1 is a schematic overview of a system according to the present invention.

Referring to FIG. 1, an image source 10 provides image data to subsequent processing and filtering circuitry. The image source 10 will typically be a CMOS pixel array, examples of which are well known. Typically also, the subsequent processing and filtering circuitry to be described below will be provided in the same chip as the image source 10. However, the invention is not limited to such applications. Other forms of image source may be used (e.g., a CCD image sensor), and the various circuits could be formed on separate chips.

It will be assumed in the following description that the image source 10 comprises red, green and blue pixels arranged in a Bayer pattern. This is by way of example only, and it will be apparent that the invention may be applied to other pixel patterns and to black-and-white image signals.

The image signal from the image source 10 is fed sequentially through three circuits: a processing circuit 12, a preliminary filter 14, and a main filter 16. The last of these may be any known arrangement for removing the effect of defective pixels. One example is the scythe filter as described in EP05250101.2. The operation of this can be summarized as comprising the steps of obtaining a central pixel value and a plurality of neighboring pixel values; determining the average value of each opposing pair of pixel values; comparing each average value with the central pixel value; and replacing the central pixel value with the average value which is closest to the central pixel value.

Each of the circuits 12-16 is provided with a register bank 18 controlled by a host/arbitration unit 20 via an imaging control bus 22. The processing circuit 12 operates to read out image data from the image source 10 and convert this into a standard image or video signal.

During this conventional operation, the pixel array is scanned for readout in a raster fashion. It is to be appreciated that the terms describing the relative positions of pixels in an array are a normal choice adopted for convenience of description. In general, the pixels are thought of as being arranged in rows and columns, and the array is described as having top and bottom rows and left and right sides. The following description refers to a notional pixel array as viewed from the perspective of the image source in FIG. 1, but it is to be realized that the usage of these relative terms is in no way intended to limit the scope of protection to a specific position of image sensor.

In a normal course of operation, successive rows of pixels are scanned from a left side (the origin side) of the pixel array to a right side (the destination side) of the pixel array, progressing from top to bottom. It is also possible for successive columns to be scanned in this way.

However, sometimes the user of a device that incorporates the image sensor wishes to read out a flipped image, i.e., one that is inverted horizontally, vertically or both. During a horizontal flip mode, the pixel array is instead read out from the right side (the origin side) to the left side (the destination side), again from top to bottom, while during a vertical flip mode the pixel array is instead read out from bottom to top.

The switching of the readout between regular operation and one or more of horizontal and vertical flip modes is controlled in a well known manner by varying timing control signals that are sent to the readout circuitry.

Before shipping an image sensor to a customer, the batch of sensors need to be tested to make sure they are compliant with various requirements. As part of these known test procedures, pixel defects are identified. This may be, for example, by locating pixels which remain at a dark or a light value under varying conditions. Single defects can be removed by the above mentioned filtering techniques, but the existence of too many couplet defects means that the image sensor has to be discarded.

The preliminary filter 14 of FIG. 1 forms a preprocessing function to reduce a couplet to a singlet, which can then be corrected by the main filter 16. The operation of the preliminary filter 14 is restricted to the pixel values that are part of a couplet. The locations these pixels are identified during manufacture of the image sensor and provided as inputs to the preliminary filter 14. Manufacture in this context is taken to mean any process carried out prior to the shipping of a product to the end user including testing and implementation phases, and which is carried out with respect of the sensor chip itself, the sensor module or of the device that incorporates the image sensor.

The preliminary filter 14 acts to replace a first defective pixel value in the couplet with a corrected pixel value, derived from a neighboring pixel value in the row of the pixel value to be replaced, and preferably by a duplication of the neighboring pixel's value as that of the replaced pixel value. The other defective pixel value in the couplet is ignored by the preliminary filter, leaving it to be corrected by the more sophisticated and accurate main filter 16.

The neighboring pixel value is chosen to be a value that is known not to represent a defective pixel, that is, the value is valid for the purposes of the preliminary filter 14. It is important that the preliminary filter 14 acts on the first pixel value of the couplet because of the sequential nature of the filters 14, 16. The filtered outputs of the preliminary filter 14 are the inputs for the main filter 16, and so as the pixel array is scanned, the first pixel value in the couplet needs to be dealt with so that the second value is replaced correctly by the main filter 16.

In a first embodiment, the pixel locations of both pixels in the couplet are stored to be input to the preliminary filter 14, preferably along with the locations of other single defects. The neighboring pixel value is then known to be valid because its location is not stored.

In an alternative embodiment, the pixel locations of only one pixel in the couplet are stored to be input to the preliminary filter 14. This pixel value is taken from the first pixel in the couplet, that is, the pixel of the couplet that is read out before the other pixel of the couplet. In this sense, the first pixel in the couplet is thought of as preceding the other pixel in the couplet.

These and further aspects will now be discussed with reference to the specific embodiment shown in FIGS. 2A-2F, which illustrates an embodiment for an image sensor wherein the pixel array is overlaid with a Bayer pattern color filter array. The Bayer pattern is well known, and comprises rows of alternating green sensitive and red sensitive pixels interleaved with rows of alternating green sensitive and blue sensitive pixels.

Figure 2A:
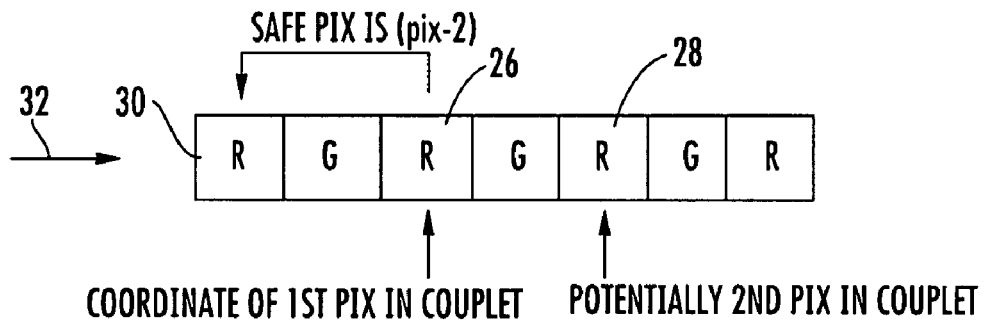
FIGS. 2A-2F illustrate transfer of pixel values in a variety of situations according to the present invention.

FIG. 2A shows a first example of the operation of the preliminary filter 14. The direction of scanning is shown by the arrow 32, and in this case is taken to represent the regular left-to-right scan used to render images. The defective couplet comprises pixels 26 and 28, which are adjacent in the red color plane. Because the direction of scanning is regular, the pixel 26 precedes the pixel 28 and is thus taken to be the first pixel.

The preliminary filter 14 operates to replace the first pixel value with a pixel value 30 in the same color plane that precedes the first pixel of the couplet, usually the adjacent pixel in that row as shown in FIG. 2A. The preliminary filter 14 obtains the replacement pixel value for the first pixel from the pixel value at a predetermined coordinate position, which in this case is equivalent to shifting two pixels to the left, to the adjacent pixel value 30 in the same color plane as the first pixel 26.

The second pixel 28 is then left uncorrected in order to be dealt with by the main filter 16. The correction by the preliminary filter 14 is an approximate value, and so it would not be desirable to correct for both pixel values in the couplet in this way. However, one of the defective pixel values needs to be corrected in order for the main filter 16 to perform its function.

Figure 2B:
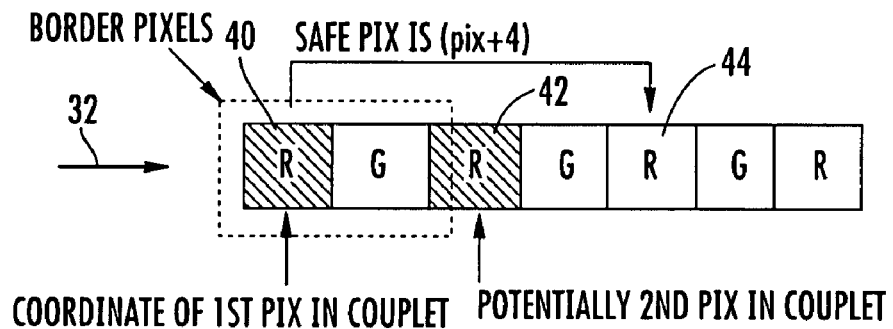
Figure 2C:
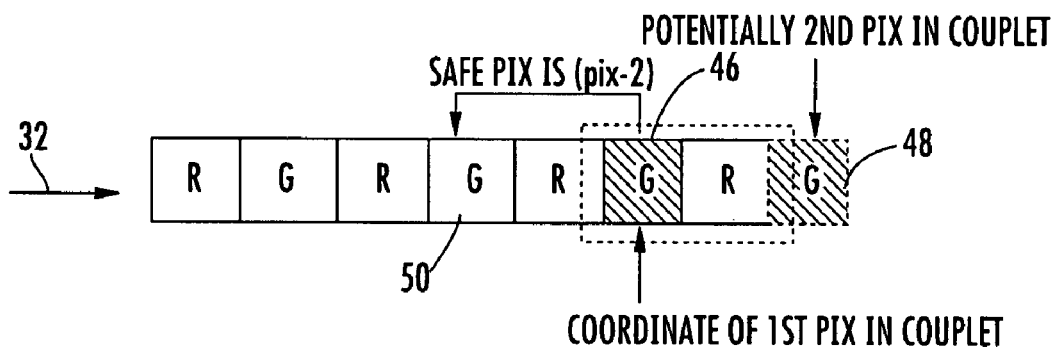
Figure 2D:
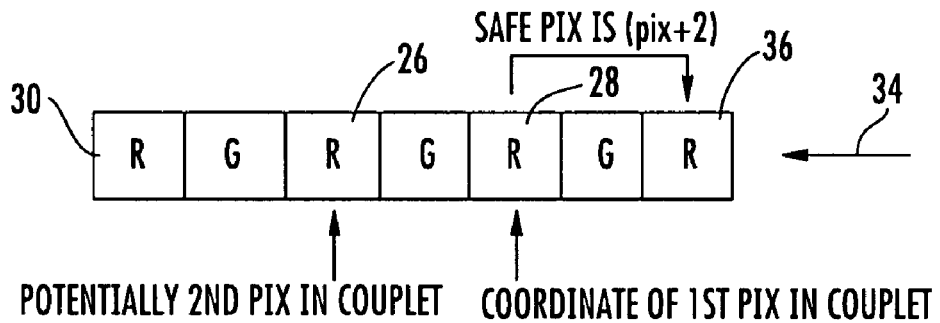

For a specific couplet, the identity of the first pixel may depend on the direction of scanning, and this needs to be taken into account by the preliminary filter 14. This is illustrated in FIG. 2D, which shows the same pixel row as seen in FIG. 2A. The direction of scanning, shown by arrow 34, is now in the opposite, or horizontally flipped, direction and so the first pixel is now pixel 28.

However, if the preliminary filter 14 is still to look two pixels to the left, the pixel 26 would be chosen as the replacement value, which would not give the desired effect. The predetermined coordinate position from which the preliminary filter 14 obtains the replacement pixel value is therefore in this case set to be equivalent to shifting two pixels to the right, to the adjacent pixel value 36 in the same color plane as the first pixel 28. Thus, the integrity of the preliminary filter is maintained.

The direction 32, 34 of scanning is encoded in a command given to the readout circuitry in a known manner. This command signal is also relayed as an input to the preliminary filter 14. On the basis of the command signal, the preliminary filter 14 then switches to a mode to select a differing predetermined coordinate shift in order to ensure that the chosen pixel to replace the first pixel value in the couplet is taken from the preceding pixel value in the relevant color plane, rather than from the proceeding pixel value, which can be the second pixel in the couplet.

This system is to be implemented the same way regardless of the orientation of the couplet, that is, whether the pixels in the couplet are horizontally, vertically or diagonally arranged. In any of the cases, the first pixel is still defined in the same way and the preliminary filter 14 operates in the same manner.

In a further possible modification, the preliminary filter 14 can be improved by taking border effects into account. The situation for a regular scan, with the direction of scanning shown by arrow 32, is shown in FIGS. 2B and 2C. As described above, the default substitution made by the preliminary filter 14 is to use the pixel value from a coordinate shifted two pixels to the left. However, when the first pixel 40 of a couplet pair 40, 42 is at the left side border of the pixel array, there is no left side pixel value to choose from. Therefore, the chosen pixel value is taken from pixel 44 which is the second proceeding (in contrast to preceding) pixel in the color plane from the first pixel 40. The coordinate shift is therefore four pixels to the right of the first pixel 40.

It can be seen from FIG. 2C that a right hand side border for a regular scan can be treated as normal. The value of the first pixel 46 of the pixel couplet 46, 48 is replaced by the value from the preceding pixel 50 in the same manner. Therefore, in order to take into account border effects for a regular scan pattern, the preliminary filter is further encoded with an algorithmic step such that if the horizontal coordinate of the pixel is equal to 0 or whatever other value is chosen as the minimum row value (indicating a left side border pixel), the predetermined coordinate shift is set to be four pixels to the right. Otherwise the coordinate shift is two to the left as normal for regular scanning.

Figure 2E:
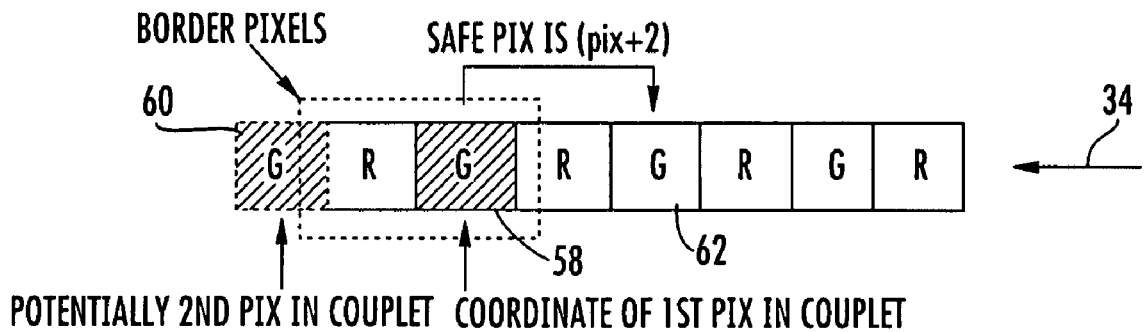
Figure 2F:
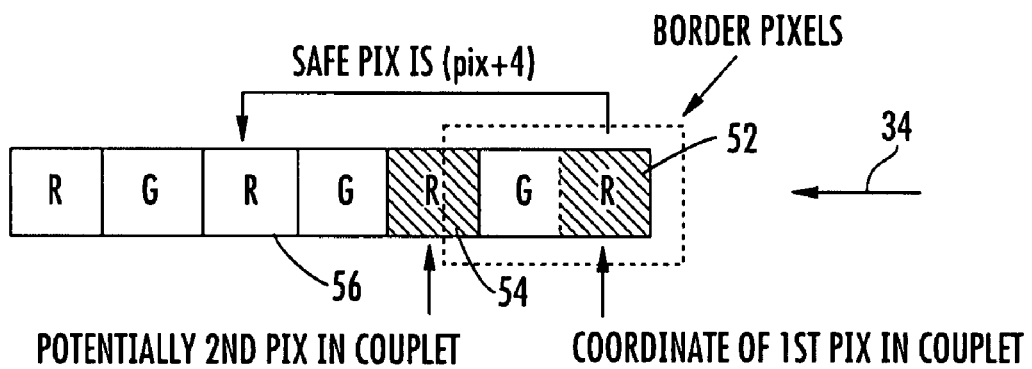
Figure 4:
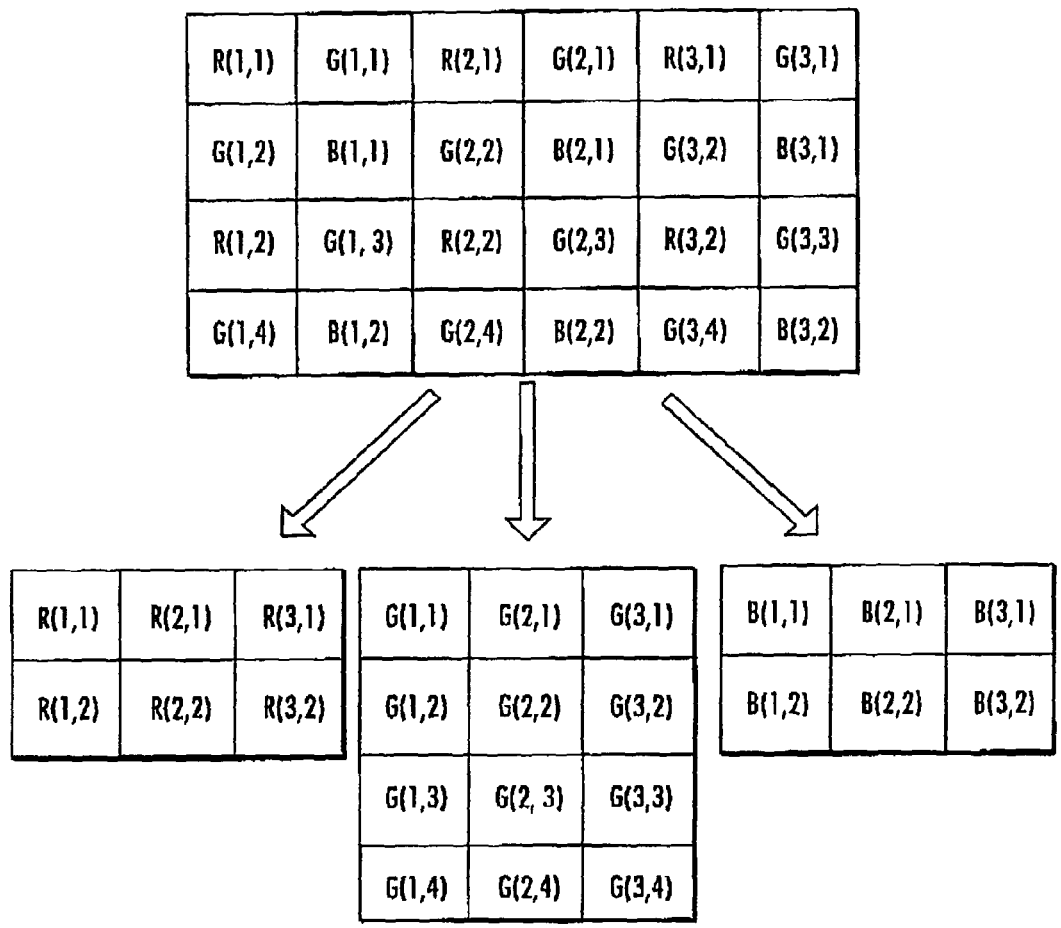
Figure 5:
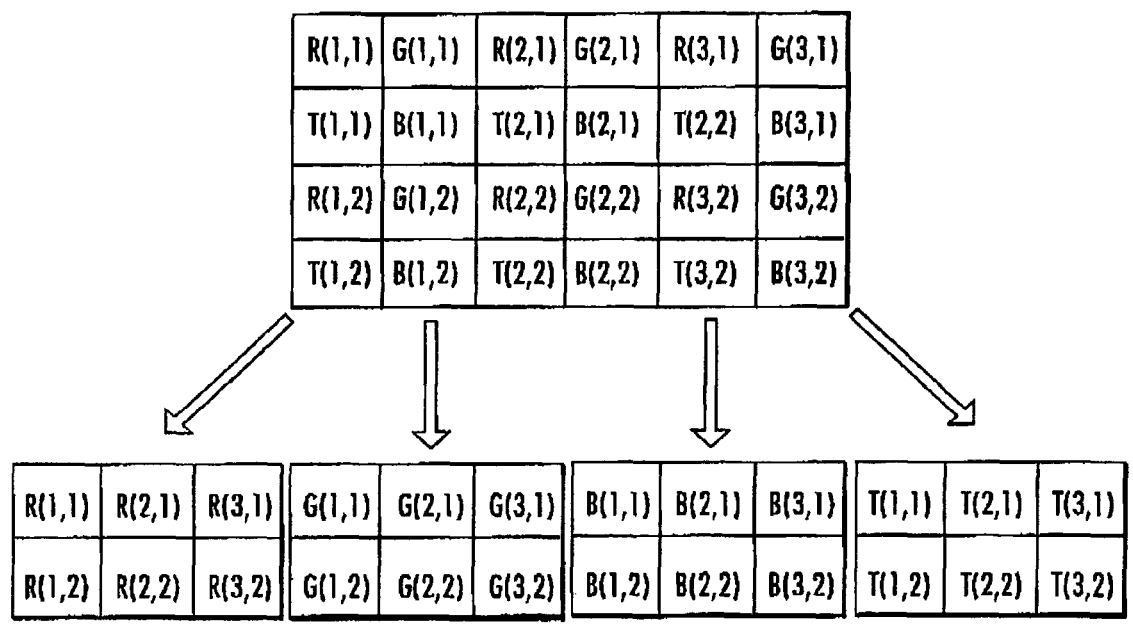
Figure 6:
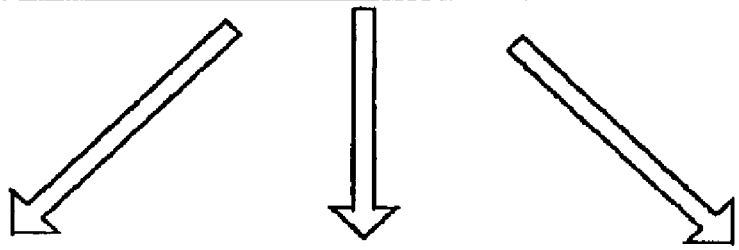

Similarly, border effects can be taken into account for a flipped scan, as shown in FIGS. 2E and 2F where the direction of scanning shown by arrow 34. As described above, the default substitution made by the preliminary filter 14 is to use the pixel value from a coordinate shifted two pixels to the right. However, when the first pixel 52 of a couplet pair 52, 54 (see FIG. 2F) is at the right side border of the pixel array, there is no right side pixel value to choose from. Therefore, the chosen pixel value is taken from pixel 56 which is the second proceeding (in contrast to preceding) pixel in the color plane from the first pixel 52. The coordinate shift is therefore four pixels to the left of the first pixel 52.

It can be seen from FIG. 2E that a left hand side border for a flipped scan can be treated as normal. The value of the first pixel 58 of the pixel couplet 58, 60 is replaced by the value from the preceding pixel 62 in the same manner.

Therefore, in order to take into account border effects for a flipped scan pattern, the preliminary filter is further encoded with an algorithmic step such that if the horizontal coordinate of the pixel is equal to the highest row number (indicating a right side border pixel), the predetermined coordinate shift is set to be four pixels to the left. Otherwise, the coordinate shift is two to the right as normal for flipped scanning.

While the above examples have been described with reference to rows of the pixel array, it is to be appreciated that the above could also be applied in a similar fashion to the array's columns, wherein the right and left borders would be referred to instead as top and bottom borders.

As mentioned above, the locations of the defective pixel values which are discovered during manufacture form the basis for defining the scope of operation of the preliminary filter 14. These locations can be stored in any suitable memory 24, either off chip or on chip. The memory 24 may suitably comprise an on-chip non-volatile memory (NVM) 24. The NVM only needs to be large enough to store the locations of the pixels in the couplets. When the image sensor is operated, the coordinates of the first pixels of any defective couplets are copied into local register space on power-up. The first pixel locations will be a one-half subset of the locations stored on the memory 24. When the image sensor is to be operated in a regular scanning mode, a first subset of pixel locations will correspond to the first pixels of each couplet, but if the image sensor is to be operated in a flipped scanning mode, a second subset of pixel locations will correspond to the first pixels of each couplet.

The present invention therefore provides many advantages. The main filter 16 can be any suitable form of defect correction mechanism. By performing a preliminary filtering, this removes ambiguities from the input to the main filter and thus improves its operation. The invention enables image sensors to provide acceptable performance even with a level of defects which would have led to rejection in the prior art. The yield of the manufacturing process is thus improved. Improvements and modifications can be made to the above without departing from the scope of the invention.

That which is claimed:

1. A method of correcting for pixel defects in an output of an image sensor, the method comprising:
   operating a preliminary filter to perform a preliminary filtering operation which operates on couplet defects wherein two adjacent pixels in a given image plane are defective, the preliminary filtering operation comprising replacing a signal value of a first pixel in the couplet with a corrected signal value and ignoring the other defective pixel in the couplet, with the ignoring comprising not using a signal value of the other defective pixel when replacing the signal value of the first pixel in the couplet; and
   operating a main filter to perform a main filtering operation on a signal resulting from the preliminary filtering operation.

2. The method of claim 1, wherein the corrected signal value in the preliminary filtering operation is a value of a neighboring non-defective pixel.

3. The method of claim 1, wherein performing the preliminary filtering operation comprises identifying a scanning direction of a readout process, and based on the identifying, choosing a pixel value from a pixel preceding the first pixel in the direction of scanning as the corrected signal value.

4. The method of claim 3, wherein the pixel preceding the first pixel in the direction of scanning is defined by a coordinate shift.

5. The method of claim 4, wherein the coordinate shift with respect to the first pixel corresponds to a translation in an opposite direction along a row to the direction in which the rows are sequentially being scanned.

6. The method of claim 3, wherein performing the preliminary filtering operation further comprises, for a couplet in which the first pixel is on a border of an origin side in the direction of scanning, choosing a pixel value from a pixel proceeding the first pixel in the direction of scanning as the corrected signal value.

7. The method of claim 6, wherein the pixel proceeding the first pixel in the direction of scanning is defined by a coordinate shift.

8. The method of claim 7, wherein the coordinate shift with respect to the first pixel corresponds to a translation along the direction in which rows are being scanned.

9. The method of claim 1, wherein the couplet defects are identified at manufacture and their location is stored in a memory.

10. The method of claim 9, wherein the memory comprises a non-volatile memory.

11. The method of claim 1, wherein the main filtering operation comprises:
   obtaining a central pixel value and a plurality of neighboring pixel values;
   determining the average value of each opposing pair of pixel values;
   comparing each average value with the central pixel value; and
   replacing the central pixel value with the average value which is closest to the central pixel value.

12. A signal processing system for use with an image sensor having a pixel array, the signal processing system comprising:
   a preliminary filter for receiving image data and for performing a preliminary filtering operation which operates on couplet defects wherein two adjacent pixels in a given image plane are defective, the preliminary filtering operation comprising replacing a signal value of a first pixel in the couplet with a corrected signal value and ignoring the other defective pixel in the couplet, with the ignoring comprising not using a signal value of the other defective pixel when replacing the signal value of the first pixel in the couplet; and
   a main filter for performing a main filtering operation on a signal resulting from the preliminary filtering operation.

13. The system of claim 12, wherein the corrected signal value in the preliminary filtering operation is a value of a neighboring non-defective pixel.

14. The system of claim 12, wherein said preliminary filter identifies a scanning direction of a readout process, and chooses a pixel value from a pixel preceding the first pixel in the direction of scanning as the corrected signal value.

15. The system of claim 14, wherein choosing the pixel value comprises defining a coordinate shift.

16. The system of claim 15, wherein the coordinate shift with respect to the first pixel corresponds to a translation in an opposite direction along a row to the direction in which the rows are sequentially being scanned.

17. The system of claim 14, wherein said preliminary filter identifies whether a couplet is on a border of the origin side in the direction of scanning, and chooses a pixel value from a pixel proceeding the first pixel in the direction of scanning as the corrected signal value.

18. The system of claim 17, wherein choosing the pixel value from a pixel proceeding the first pixel in the direction of scanning defines a coordinate shift.

19. The system of claim 18, wherein the coordinate shift with respect to the first pixel corresponds to a translation along the direction in which rows are being scanned.

20. The system of claim 12, further comprising a memory for storing locations of couplet defects.

21. The system of claim 20, wherein said memory comprises a non-volatile memory forming part of the image sensor.

22. The system of claim 12, wherein said main filter is configured for:
    obtaining a central pixel value and a plurality of neighboring pixel, values;
    determining an average value of each opposing pair of pixel values;
    comparing each average value with the central pixel value; and
    replacing the central pixel value with the average value which is closest to the central pixel value.

23. An image sensor apparatus comprising:
    a pixel array;
    a controller for operating said pixel array to produce an image data stream; and
    a signal processing system for processing the image data stream and comprising
        a preliminary filter for receiving the image data stream and for performing a preliminary filtering operation which operates on couplet defects wherein two adjacent pixels in a given image plane are defective, the preliminary filtering operation comprising replacing a signal value of a first pixel in the couplet with a corrected signal value and ignoring the other defective pixel in the couplet, with the ignoring comprising not using a signal value of the other defective pixel when replacing the signal value of the first pixel in the couplet, and
        a main filter for performing a main filtering operation on a signal resulting from the preliminary filtering operation.

24. The image sensor apparatus of claim 23, wherein the corrected signal value in the preliminary filtering operation is a value of a neighboring non-defective pixel.

25. The image sensor apparatus of claim 23, wherein said preliminary filter identifies a scanning direction of a readout process, and chooses a pixel value from a pixel preceding the first pixel in the direction of scanning as the corrected signal value.

26. The image sensor apparatus of claim 25, wherein choosing the pixel value comprises defining a coordinate shift, and wherein the coordinate shift with respect to the first pixel corresponds to a translation in an opposite direction along a row to the direction in which the rows are sequentially being scanned.

27. The image sensor apparatus of claim 25, wherein said preliminary filter identifies whether a couplet is on a border of the origin side in the direction of scanning, and chooses a pixel value from a pixel proceeding the first pixel in the direction of scanning as the corrected signal value.

28. The image sensor apparatus of claim 27, wherein choosing the pixel value from a pixel proceeding the first pixel in the direction of scanning defines a coordinate shift, and wherein the coordinate shift with respect to the first pixel corresponds to a translation along the direction in which rows are being scanned.

29. The image sensor apparatus of claim 23, further comprising a memory for storing locations of couplet defects, and wherein said memory comprises a non-volatile memory forming part of the image sensor.

30. The image sensor apparatus of claim 23, wherein said main filter is configured for:
    obtaining a central pixel value and a plurality of neighboring pixel values;
    determining an average value of each opposing pair of pixel values;
    comparing each average value with the central pixel value; and
    replacing the central pixel value with the average value which is closest to the central pixel value.

31. The image sensor apparatus of claim 23, wherein said pixel array, said controller and said signal processing system are formed as a single chip.

32. The image sensor apparatus of claim 23, wherein said pixel array is part of at least one of the following: a mobile device, a webcam, an optical mouse and a video camera.

* * * * *